US 10,247,023 B2

(12) United States Patent
Beattie et al.

(10) Patent No.: US 10,247,023 B2
(45) Date of Patent: Apr. 2, 2019

(54) SEAL DAMPER WITH IMPROVED RETENTION

(71) Applicant: United Technologies Corporation, Hartford, CT (US)

(72) Inventors: Jeffrey S. Beattie, South Glastonbury, CT (US); Jeffrey Michael Jacques, East Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 411 days.

(21) Appl. No.: 14/429,089

(22) PCT Filed: Mar. 14, 2013

(86) PCT No.: PCT/US2013/031368
§ 371 (c)(1),
(2) Date: Mar. 18, 2015

(87) PCT Pub. No.: WO2014/051688
PCT Pub. Date: Apr. 3, 2014

(65) Prior Publication Data
US 2015/0226077 A1    Aug. 13, 2015

Related U.S. Application Data

(60) Provisional application No. 61/706,811, filed on Sep. 28, 2012.

(51) Int. Cl.
*F01D 5/22* (2006.01)
*F01D 5/26* (2006.01)
*F01D 11/00* (2006.01)

(52) U.S. Cl.
CPC .............. *F01D 11/006* (2013.01); *F01D 5/22* (2013.01); *F01D 5/26* (2013.01); *F01D 11/008* (2013.01)

(58) Field of Classification Search
CPC ........ F01D 11/006; F01D 11/008; F01D 5/22; F01D 5/26; F01D 5/323; F01D 5/326; F01D 25/04; F01D 25/06
See application file for complete search history.

(56) References Cited

U.S. PATENT DOCUMENTS 4,505,642 A    3/1985  Hill
4,516,910 A    5/1985  Bouiller et al.
(Continued)

FOREIGN PATENT DOCUMENTS

EP    0851097    7/1998
EP    0717169    9/2001
(Continued)

OTHER PUBLICATIONS

The European Search Report for European Patent Application No. 13841886.8 completed Jun. 16, 2016.
(Continued)

*Primary Examiner* — Ninh H. Nguyen
*Assistant Examiner* — Brian P Wolcott
(74) *Attorney, Agent, or Firm* — Carlson, Gaskey & Olds, P.C.

(57) ABSTRACT

A seal damper system includes a plurality of circumferentially spaced blades that each include a platform and an airfoil that extends radially outwardly from the platform. A pocket is arranged circumferentially intermediate the blades and radially inwardly of the platform. A seal damper is arranged in the pocket. The seal damper includes a base section that extends along an axial dimension from a first axial end to an opposing second axial end. The base section joins a first arm that extends radially inwardly from the first axial end and a second arm that extends radially inwardly from the second axial end. The first arm includes a free end having a pair of spaced apart shoulders.

12 Claims, 4 Drawing Sheets

(56) References Cited

U.S. PATENT DOCUMENTS

| | | | |
|---|---|---|---|
| 5,281,097 A | 1/1994 | Wilson et al. | |
| 5,573,375 A * | 11/1996 | Barcza | F01D 11/008 |
| | | | 416/190 |
| 5,746,578 A | 5/1998 | Brassfield et al. | |
| 5,827,047 A | 10/1998 | Gonsor et al. | |
| 6,171,058 B1 | 1/2001 | Stec | |
| 6,533,550 B1 | 3/2003 | Mills | |
| 7,121,800 B2 * | 10/2006 | Beattie | F01D 5/10 |
| | | | 416/190 |
| 7,214,034 B2 * | 5/2007 | Giot | F01D 5/22 |
| | | | 416/193 A |
| 7,625,174 B2 | 12/2009 | Drerup et al. | |
| 2006/0056974 A1 | 3/2006 | Beattie | |
| 2011/0014050 A1 | 1/2011 | Lake et al. | |
| 2012/0237352 A1 | 9/2012 | Boyer et al. | |
| 2013/0195665 A1 * | 8/2013 | Snyder | F01D 5/22 |
| | | | 416/174 |

FOREIGN PATENT DOCUMENTS

| | | |
|---|---|---|
| EP | 1452694 | 10/2004 |
| EP | 1600606 | 11/2005 |
| FR | 2963382 | 2/2012 |
| JP | 11-062502 | 3/1999 |
| WO | 20130154657 | 10/2013 |

OTHER PUBLICATIONS

International Preliminary Report on Patentability for PCT Application No. PCT/US2013/031368 dated Apr. 9, 2015.

International Search Report and Written Opinion for International Application No. PCT/US2013/031368 completed on Jun. 24, 2013.

Singapore Search Report for Singapore Application No. 11201502166V dated Jan. 14, 2016.

* cited by examiner

SEAL DAMPER WITH IMPROVED RETENTION

CROSS REFERENCE TO RELATED APPLICATION

This application claims priority to U.S. Provisional Application No. 61/706,811, which was filed 28 Sep. 2012 and is incorporated herein by reference.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

A speed reduction device such as an epicyclical gear assembly may be utilized to drive the fan section such that the fan section may rotate at a speed different than the turbine section so as to increase the overall propulsive efficiency of the engine. In such engine architectures, a shaft driven by one of the turbine sections provides an input to the epicyclical gear assembly that drives the fan section at a reduced speed such that both the turbine section and the fan section can rotate at closer to optimal speeds.

SUMMARY OF THE INVENTION

A seal damper system according to an exemplary aspect of the present disclosure includes a plurality of circumferentially spaced blades which each include a platform and an airfoil which extends radially outward from the platform. A pocket is arranged circumferentially intermediate the blades and radially inward of the platform, and a seal damper arranged in the pocket. The seal damper includes a base section which extends along an axial dimension from a first axial end to an opposing second axial end. The base section joins a first arm which extends radially inwardly from the first axial end and a second arm which extends radially inward from the second axial end. The first arm includes a free end which has a pair of spaced apart shoulders that projects therefrom.

In a further non-limiting embodiment of any of the foregoing examples, the shoulders are circumferentially spaced apart.

In a further non-limiting embodiment of any of the foregoing examples, the base section is free of any laterally projecting wings.

In a further non-limiting embodiment of any of the foregoing examples, the second arm is axially contoured.

A further non-limiting embodiment of any of the foregoing examples, a tab projects forward from the free end of the first arm.

In a further non-limiting embodiment of any of the foregoing examples, the tab is arranged circumferentially between the pair of spaced apart shoulders.

In a further non-limiting embodiment of any of the foregoing examples, the tab is radially offset from tips of the shoulders.

In a further non-limiting embodiment of any of the foregoing examples, the shoulders are axially contoured.

A seal damper according to an exemplary aspect of the present disclosure includes a base section which extends along an axial dimension from a first axial end to an opposing second axial end. The base section joins a first arm which extends outwardly from the first axial end and a second arm which extends outwardly from the second axial end. The first arm includes a free end which has a pair of spaced apart shoulders that project therefrom.

A seal damper system according to an exemplary aspect of the present disclosure includes a plurality of circumferentially spaced blades, each includes a platform and an airfoil which extend radially outwardly from the platform, with a pocket arranged circumferentially intermediate the blades and radially inwardly of the platform, and a seal damper arranged in the pocket. The seal damper includes a base section which extends along an axial dimension from a first axial end to an opposing second axial end. The base section joins a first arm which extends radially inwardly from the first axial end and a second arm which extends radially inwardly from the second axial end. The seal damper and the pocket are configured such that the seal damper fully seats in the pocket in only one axial orientation.

In a further non-limiting embodiment of any of the foregoing examples, the first arm of the seal damper and the pocket are configured with a tab and a slot that interlock.

In a further non-limiting embodiment of any of the foregoing examples, the tab projects forward from the first arm.

In a further non-limiting embodiment of any of the foregoing examples, the tab is arranged circumferentially between a pair of spaced apart shoulders projecting from a free end of the first arm.

In a further non-limiting embodiment of any of the foregoing examples, the tab is radially offset from a tip of a free end of the first arm.

BRIEF DESCRIPTION OF THE DRAWINGS

The disclosure can be further understood by reference to the following detailed description when considered in connection with the accompanying drawings which are briefly described as follows.

DESCRIPTION

Figure 1:
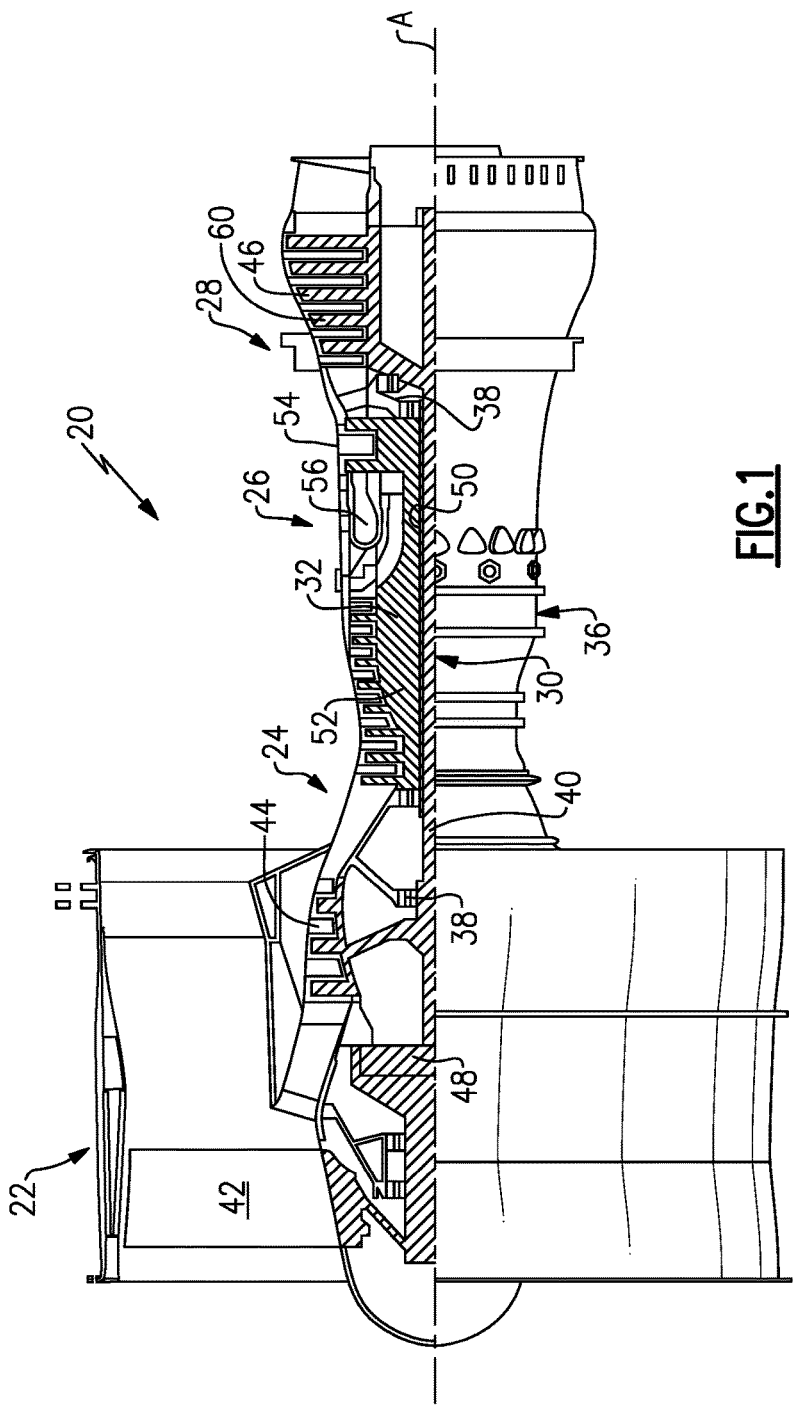
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans and the teachings may be applied to other types of turbine engines, including three-spool architectures and ground-based turbines.

The engine 20 generally includes a first spool 30 and a second spool 32 mounted for rotation about an engine central axis A relative to an engine static structure 36 via several bearing systems 38. It should be understood that various bearing systems 38 at various locations may alternatively or additionally be provided.

The first spool 30 generally includes a first shaft 40 that interconnects a fan 42, a first compressor 44 and a first turbine 46. The first shaft 40 is connected to the fan 42 through a gear assembly of a fan drive gear system 48 to drive the fan 42 at a lower speed than the first spool 30. The second spool 32 includes a second shaft 50 that interconnects a second compressor 52 and second turbine 54. The first spool 30 runs at a relatively lower pressure than the second spool 32. It is to be understood that "low pressure" and "high pressure" or variations thereof as used herein are relative terms indicating that the high pressure is greater than the low pressure. An annular combustor 56 is arranged between the second compressor 52 and the second turbine 54. The first shaft 40 and the second shaft 50 are concentric and rotate via bearing systems 38 about the engine central axis A which is collinear with their longitudinal axes.

The core airflow is compressed by the first compressor 44 then the second compressor 52, mixed and burned with fuel in the annular combustor 56, then expanded over the second turbine 54 and first turbine 46. The first turbine 46 and the second turbine 54 rotationally drive, respectively, the first spool 30 and the second spool 32 in response to the expansion.

The engine 20 is a high-bypass geared aircraft engine that has a bypass ratio that is greater than about six (6), with an example embodiment being greater than ten (10), the gear assembly of the fan drive gear system 48 is an epicyclic gear train, such as a planetary gear system or other gear system, with a gear reduction ratio of greater than about 2.3:1 and the first turbine 46 has a pressure ratio that is greater than about 5. The first turbine 46 pressure ratio is pressure measured prior to inlet of first turbine 46 as related to the pressure at the outlet of the first turbine 46 prior to an exhaust nozzle. The first turbine 46 has a maximum rotor diameter and the fan 42 has a fan diameter such that a ratio of the maximum rotor diameter divided by the fan diameter is less than 0.6. It should be understood, however, that the above parameters are only exemplary.

A significant amount of thrust is provided by the bypass flow B due to the high bypass ratio. The fan section 22 of the engine 20 is designed for a particular flight condition— typically cruise at about 0.8 Mach and about 35,000 feet. The flight condition of 0.8 Mach and 35,000 feet, with the engine at its best fuel consumption. To make an accurate comparison of fuel consumption between engines, fuel consumption is reduced to a common denominator, which is applicable to all types and sizes of turbojets and turbofans. The term is thrust specific fuel consumption, or TSFC. This is an engine's fuel consumption in pounds per hour divided by the net thrust. The result is the amount of fuel required to produce one pound of thrust. The TSFC unit is pounds per hour per pounds of thrust (lb/hr/lb Fn). When it is obvious that the reference is to a turbojet or turbofan engine, TSFC is often simply called specific fuel consumption, or SFC. "Low fan pressure ratio" is the pressure ratio across the fan blade alone, without a Fan Exit Guide Vane system. The low fan pressure ratio as disclosed herein according to one non-limiting embodiment is less than about 1.45. "Low corrected fan tip speed" is the actual fan tip speed in feet per second divided by an industry standard temperature correction of $[(Tram\ °\ R)/(518.7°\ R)]^{0.5}$. The "Low corrected fan tip speed" as disclosed herein according to one non-limiting embodiment is less than about 1150 feet per second.

Figure 2:
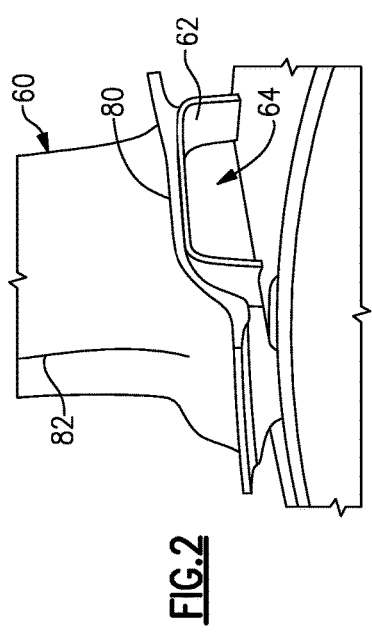
FIG. 2 illustrates a blade and a seal damper in a pocket of the blade.
Figure 3:
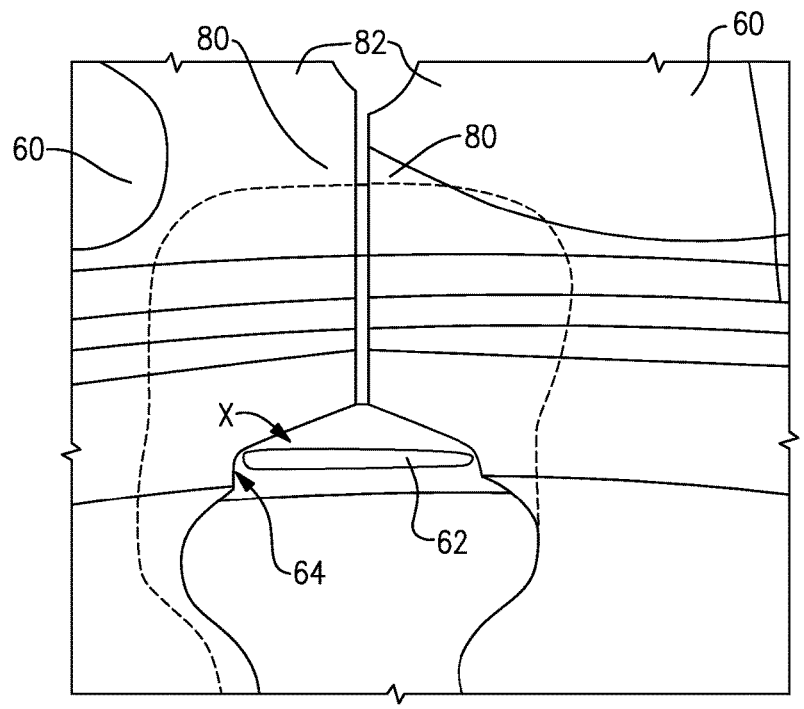
FIG. 3 illustrates a pocket circumferentially intermediate to adjacent blades and a seal damper in the pocket.

The turbine section 28 of the engine 20 includes rotatable blades 60 circumferentially arranged around the engine central axis A. FIG. 2 illustrates a portion of one of the blades 60 and FIG. 3 illustrates portions of two adjacent ones of the blades 60. A seal damper 62 is provided in a pocket 64 circumferentially between adjacent blades 60, to attenuate vibrations and provide flow sealing. If a seal damper is not properly constrained in a pocket, the seal damper can be damaged and become less effective. In this regard, the seal damper 62 can provide enhanced retention in the pocket 64, reduce seal damper seating variation in the pocket 64, increase damping, provide better sealing and improve part life.

Referring to FIG. 2, each of the blades 60 includes a platform 80 and an airfoil 82 extending radially outwardly from the platform 80. As shown in FIG. 3, the pocket 64 is arranged circumferentially intermediate adjacent ones of the blades 60, and radially inwardly of the platforms 80.

Figure 4:
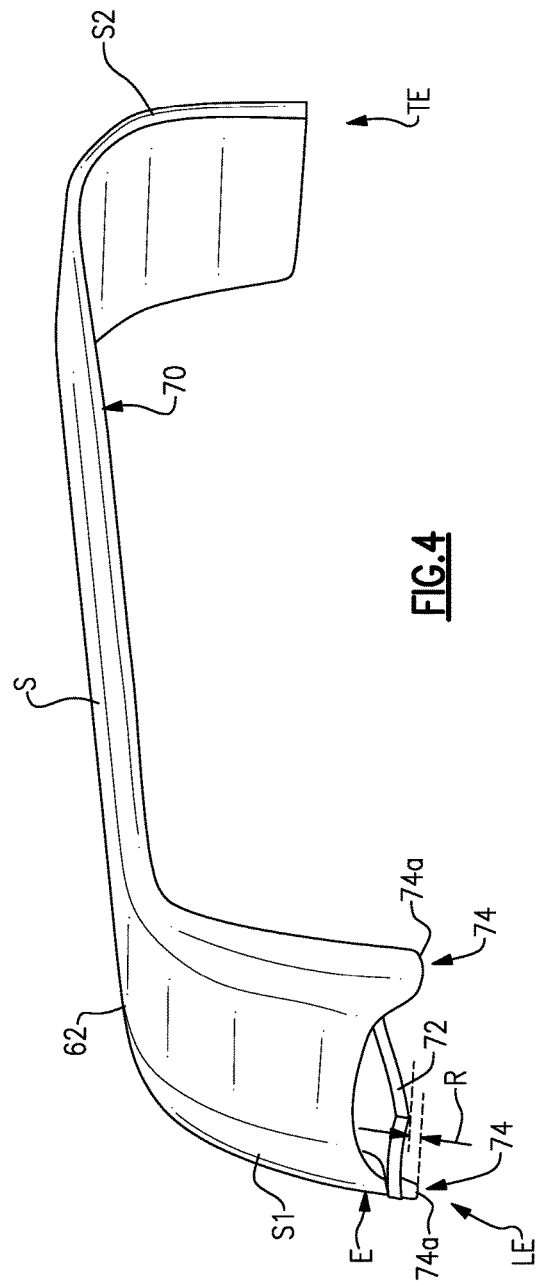
FIG. 4 illustrates an isolated view of a seal damper.
Figure 5:
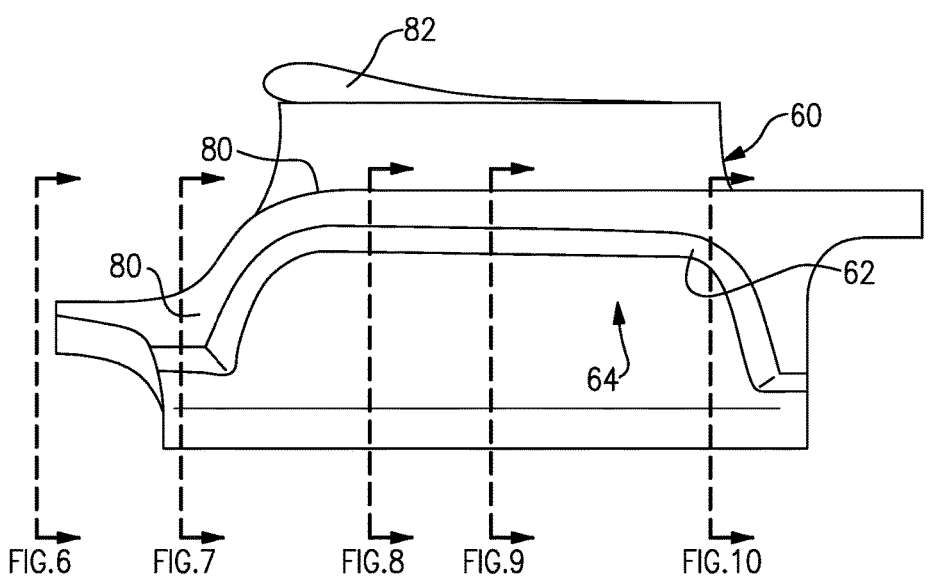
FIG. 5 illustrates a side view of the blade and seal damper of FIG. 2.
Figure 6:
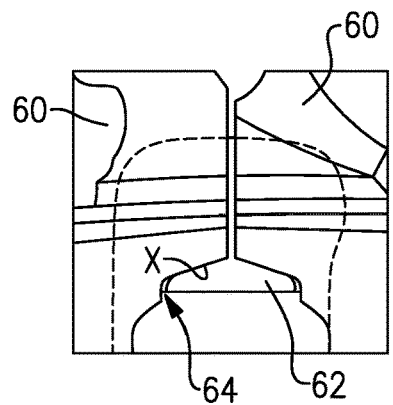
FIGS. 6-10 illustrate views of the blade, seal damper and pocket according to the sections shown in FIG. 5.
Figure 7:
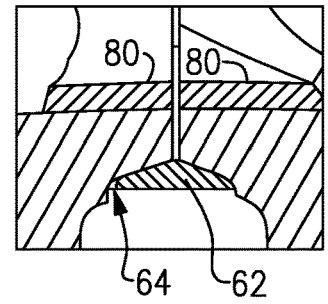
Figure 8:
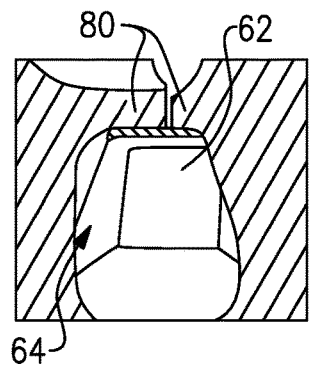
Figure 9:
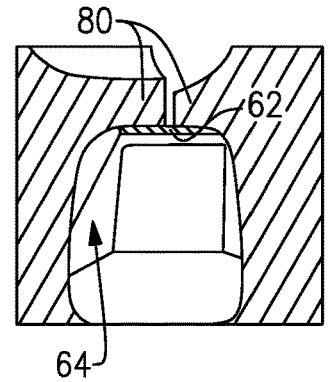
Figure 10:
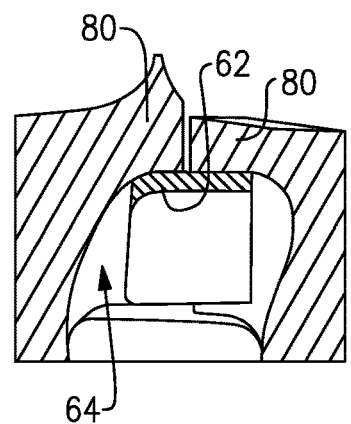

FIG. 4 shows an isolated view of the seal damper 62, FIG. 5 shows a lateral view of the seal damper 62 and pocket 64 of the blade 60, and FIGS. 6-10 show views of the seal damper 62 and pocket 64 according to the sections shown in FIG. 5. The seal damper 62 includes a seal damper body 70 that has a leading end LE and a tailing end TE that are oriented, respectively, toward a leading end and trailing end of the blade 60. The seal damper body 70 is generally U-shaped. Whereas some examples may include laterally projecting wings, the example seal damper body 70 is free of laterally extending wings. A base section S of the seal damper body 70 is generally axially oriented with respect to the engine central axis A. First and second arms S1 and S2 of the U-shape project radially inwardly from the base section S. The base section S joins the arms S1 and S2.

The first arm S1 at the LE of the seal damper body 70 includes a forwardly-projecting tab 72 located circumferentially between a pair of spaced apart shoulders 74. In this example, the tab 72 is radially offset from tips 74a of the shoulders 74, as represented at R. The tab 72 is received into a slot X in the pocket 64 for ensuring proper axial orientation of the seal damper 62 in the pocket 64 and stabilizing the damper body 70 in the pocket 64. For example, the tab 72 ensures that the seal damper 62 cannot be assembled into the pocket 64 with the second arm S2 arranged at the forward end of the pocket 64. As can be appreciated however, the tab 72 could alternatively be on the trailing end TE of the seal damper body 70, and/or the design can be modified such that the tab 72 is on the pocket 64 and the slot X is on the seal damper body 70.

The first arm S1 of the seal damper 62 includes a free end E with the radially-projecting spaced apart shoulders 74, which laterally flank the tab 72. In this example, the shoulders 74 are circumferentially spaced apart and thus increase the base width and reduce rotation of the seal damper 62 in the pocket 64. The trailing end TE of the seal damper body 70 can also include an enlarged width to further increase the base width and reduce rotation in the pocket 64. Additionally, the first arm S1 and the second arm S2 can be axially contoured with respect to the axial direction along the engine central axis A, in a cup-like shape, to provide additional stability.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A seal damper system comprising:
a plurality of circumferentially spaced blades each including a platform and an airfoil extending radially outwardly from the platform, with a pocket arranged circumferentially intermediate the blades and radially inwardly of the platform;
a seal damper arranged in the pocket, the seal damper including a base section extending along an axial dimension from a first axial end to an opposing second axial end, the base section joining a first arm extending radially inwardly from the first axial end and a second arm extending radially inwardly from the second axial end, the first arm defining a central portion and a pair of circumferentially spaced apart shoulders projecting circumferentially outwardly and radially inwardly from the central portion, the central portion extending from the first axial end of the seal damper to a free end of the first arm, the free end defining a tab projecting forwardly from the central portion in an axial direction towards a terminal portion of the free end and away from the second arm and the pair of circumferentially spaced apart shoulders, wherein the tab and central portion are wholly arranged circumferentially between the pair of circumferentially spaced apart shoulders;
wherein a radially outer surface of each of the central portion, tab, and circumferentially spaced apart shoulders is a continuous single surface that rounds away from the central portion to respective tips of the circumferentially spaced apart shoulders;
wherein the seal damper is a single piece component.

2. The seal damper system as recited in claim 1, wherein the base section is free of any laterally projecting wings.

3. The seal damper system as recited in claim 1, wherein the second arm is axially contoured.

4. The seal damper system as recited in claim 1, wherein the tab is radially offset from tips of the shoulders.

5. The seal damper system as recited in claim 1, wherein the pair of circumferentially spaced apart shoulders are axially contoured.

6. A seal damper comprising:
a base section extending along an axial dimension from a first axial end to an opposing second axial end, the base section joining a first arm extending outwardly from the first axial end and a second arm extending outwardly from the second axial end, the first arm defining a central portion and a pair of spaced apart shoulders projecting circumferentially outwardly from and extending radially inwardly from the central portion, the central portion extending from the first axial end of the seal damper to a free end of the first arm, the free end defining a tab projecting forwardly from the central portion in an axial direction towards a terminal portion of the free end and away from the second arm and the pair of spaced apart shoulders, wherein the tab and central portion are wholly arranged between the pair of spaced apart shoulders;
wherein an outer surface of each of the central portion, tab, and spaced apart shoulders is a continuous single surface that rounds away from the central portion to respective tips of the spaced apart shoulders;
wherein the seal damper is a single piece component.

7. The seal damper system as recited in claim 4, wherein the tab is radially and axially outward of the tips of the shoulders.

8. The seal damper system as recited in claim 7, wherein as the pair of circumferentially spaced apart shoulders extend away from the central portion, the circumferentially spaced apart shoulders are rounded with respect to the central portion.

9. The seal damper as recited in claim 6, wherein as the pair of spaced apart shoulders extend away from the central portion, the pair of spaced apart shoulders are rounded with respect to the central portion.

10. The seal damper system as recited in claim 1, wherein a terminal end of the tab is farther away from the second arm than any portion of the circumferentially spaced apart shoulders.

11. The seal damper as recited in claim 6, wherein a terminal end of the tab is farther away from the second arm than any portion of the spaced apart shoulders.

12. The seal damper system as recited in claim 1, wherein:
the seal damper and the pocket are configured such that the seal damper fully seats in the pocket in only one axial orientation; and
the first arm of the seal damper and the pocket are configured with the tab and a slot that interlock.

* * * * *